United States Patent
Smither (10) Patent No.: US 8,805,607 B2
(45) Date of Patent: Aug. 12, 2014

(54) VAPOUR MEASUREMENT

(75) Inventor: Benjamin David Smither, Norfolk (GB)

(73) Assignee: Robert Bosch GmbH (DE)

( * ) Notice: Subject to any disclaimer, the term of this patent is extended or adjusted under 35 U.S.C. 154(b) by 1178 days.

(21) Appl. No.: 12/679,068

(22) PCT Filed: Sep. 22, 2008

(86) PCT No.: PCT/GB2008/003205
§ 371 (c)(1),
(2), (4) Date: May 4, 2010

(87) PCT Pub. No.: WO2009/037489
PCT Pub. Date: Mar. 26, 2009

(65) Prior Publication Data
US 2010/0312453 A1    Dec. 9, 2010

(30) Foreign Application Priority Data

Sep. 20, 2007 (GB) .................................. 0718376.7
Aug. 15, 2008 (GB) .................................. 0814982.5

(51) Int. Cl.
| | |
|---|---|
| B60T 7/12 | (2006.01) |
| G05D 1/00 | (2006.01) |
| G06F 7/00 | (2006.01) |
| G06F 17/00 | (2006.01) |
| F02M 69/00 | (2006.01) |
| F02D 41/32 | (2006.01) |
| F02D 31/00 | (2006.01) |
| F02D 41/00 | (2006.01) |

(52) U.S. Cl.
CPC .............. *F02M 69/002* (2013.01); *F02D 41/32* (2013.01); *F02D 31/007* (2013.01); *F02D 41/0027* (2013.01)
USPC ........................................................ 701/103

(58) Field of Classification Search
CPC .... F02M 69/002; F02D 41/32; F02D 31/007; F02D 41/0027

USPC ................ 123/299, 304, 354, 516, 446, 447; 701/102, 104, 10; 702/23, 24; 137/392, 137/468, 554, 557; 73/114.41
See application file for complete search history.

(56) References Cited

U.S. PATENT DOCUMENTS

| | | | |
|---|---|---|---|
| 4,496,287 A | | 1/1985 | Nelson et al. |
| 4,747,300 A | * | 5/1988 | Nelson et al. ................. 73/61.73 |

(Continued)

FOREIGN PATENT DOCUMENTS

| | | |
|---|---|---|
| DE | 10127932 | 12/2002 |
| DE | 10 2005 059 176 A1 | 6/2007 |

(Continued)

OTHER PUBLICATIONS

Patents Act 1977 Combined Search and Examination Report under Sections 17 and 18(3) Application No. GB0814982.5 Date of Report: Nov. 10, 2008.

(Continued)

*Primary Examiner* — Hieu T Vo
*Assistant Examiner* — Sherman Manley
(74) *Attorney, Agent, or Firm* — Luedeka Neely Group, PC (57) ABSTRACT

The present invention provides, with reference to FIG. 1, an internal combustion engine (10) having a fuel injector which comprises a sprung piston (55) or a resilient diaphragm piston (8155) and an electrical coil (57, 8158) for displacing the piston (55, 8155). The piston draws fuel into and expels fuel from a pumping chamber (52, 8152). The number of operations of the injector per engine cycle is controlled by an electronic controller (23, 8159) to control the quality of fuel delivered per cycle to a combustion chamber. A voltage measured in the coil (52, 8158) by movement of the piston under action of the spring or due to its own resilience is used to give an indication of vapour pressure of the fuel. A device akin to the injector can be used to draw fuel from a pipeline to measure the vapour pressure of the fluid.

31 Claims, 9 Drawing Sheets

(56) References Cited

U.S. PATENT DOCUMENTS

| | | | |
|---|---|---|---|
| 6,178,811 B1 | 1/2001 | Bonne et al. | |
| 7,100,578 B2 | 9/2006 | Yamazaki et al. | |
| 7,617,039 B2 * | 11/2009 | Allen et al. | 701/110 |
| 8,051,826 B2 * | 11/2011 | Allen et al. | 123/196 R |
| 8,116,962 B2 * | 2/2012 | Allen et al. | 701/103 |
| 2009/0217909 A1 * | 9/2009 | Allen | 123/436 |
| 2010/0300407 A1 * | 12/2010 | Ravenhill et al. | 123/468 |
| 2011/0231082 A1 * | 9/2011 | Saruwatari | 701/104 |

FOREIGN PATENT DOCUMENTS

| | | |
|---|---|---|
| EP | 0014164 | 8/1980 |
| EP | 1111232 | 6/2001 |
| EP | 1460261 | 9/2004 |
| FR | 2588083 | 4/1987 |
| GB | 1195293 | 6/1970 |
| GB | 2306679 | 5/1997 |
| GB | 2421543 | 6/2006 |
| GB | 2447045 | 9/2008 |
| WO | 8603297 | 6/1986 |

OTHER PUBLICATIONS

Patents Act 1977 Combined Search and Examination Report under Sections 17 and 18(3) Application No. GB0718376.7 Date of Report: Jan. 17, 2008.

International Search Report International Application No. PCT/GB2008/003205 Date of Mailing: Jun. 24, 2009.

* cited by examiner

VAPOUR MEASUREMENT

Cross-Reference To Related Application

This application claims priority under all applicable rules and statutes to International Application No. PCT/GB2008/003205, filed Sep. 22, 2008, and entitled VAPOUR MEASUREMENT, which claims priority to GB 0718376.7, filed 20 Sep. 2007, and GB 0814982.5 filed 15 Aug. 2008, incorporated herein by reference in their entireties.

The present invention relates to vapour measurement and in particular to apparatus for measuring how much fuel vapour is present in a fuel charge delivered by a fuel injection system of an internal combustion engine.

GB-A-2421543 describes a fuel injection system comprising a fuel injector which functions as a positive displacement pump and dispenses an amount of fuel which is fixed for each and every operation of the injector. A controller controls the operation of the fuel injector and in each of at least a majority of engine cycles the fuel injector is operated on a plurality of occasions by the controller. In response to an increasing engine speed and/or load the controller increases in amount the fuel delivered per engine cycle by increasing in number the occasions the fuel injector is operated per engine cycle. In response to a decreasing engine speed and/or load the controller reduces in amount the fuel delivered per engine cycle by reducing in number the occasions the fuel injector is operated per engine cycle. The fuel injector comprises: a housing in which a fuel chamber is formed; an electrical coil; and a piston which slides axially in a bore in the housing under the action of the electrical coil to force fuel out of the fuel chamber, the piston sliding between two end stops which ensure that the piston has a set distance of travel in each operation.

Gasoline fuel has a tendency to vaporise at normal working temperatures in an internal combustion engine. This can detrimentally affect the operation of its fuel injection system. Instead of injecting a full amount of fuel charge, the injector can end up injecting a lesser amount due to the presence of vapour in the fuel. In traditional pulse width modulation (PWM) fuel injection systems this problem has been recognised and dealt with by the use of high pressure fuel supply lines; by keeping the fuel at high pressure the presence of fuel vapour in the supply lines is minimised.

The present invention provides in a first aspect an internal combustion engine comprising:
  a variable volume combustion chamber;
  an air intake system for delivering charge air to the combustion chamber;
  an exhaust system for relaying combusted gas from the combustion chamber to atmosphere; and
  a fuel injection system for delivering fuel into the charge air for combustion therewith in the combustion chamber;
wherein the fuel injection system comprises:
  a fuel injector which functions as a positive displacement pump and which comprises a housing in which a pumping chamber is formed; an electrical coil; a piston which slides axially in a bore in the housing under action of the electrical coil; and a biasing spring which acts on the piston; and
  a controller which controls the operation of the fuel injector;
  wherein:
  in each of at least a majority of engine cycles the fuel injector is operated on a plurality of occasions by the controller;
  in response to an increasing engine speed and/or load the controller increases in amount the fuel delivered per engine cycle by increasing in number the occasions the fuel injector is operated per engine cycle;
  in response to a decreasing engine speed and/or load the controller reduces in amount the fuel delivered per engine cycle by reducing in number the occasions the fuel injector is operated per engine cycle;
  motion of the piston in a first direction draws fuel into the pumping chamber and motion of the piston in the opposite direction expels fluid from the pumping chamber;
  motion of the piston under action of the spring occasions a voltage in the coil;
  the controller uses the voltage occasioned by the piston motion under action of the spring to determine an indication of an amount of fuel vapour present in the pumping chamber; and
  the controller adjusts operation of the injector in dependence on the indicated amount of fuel vapour, the controller increasing in number the occasions the fuel injector is operated per engine cycle in response to an indication of an increased fuel vapour amount.

In a second aspect the present invention provides an internal combustion engine comprising:
  a variable volume combustion chamber;
  an air intake system for delivering charge air to the combustion chamber;
  an exhaust system for relaying combusted gas from the combustion chamber to atmosphere; and
  a fuel injection system for delivering fuel into the charge air for combustion therewith in the combustion chamber;
wherein
  the fuel injection system comprises:
  a fuel injector which functions as a positive displacement pump and which comprises: a housing in which a pumping chamber is formed; an electrical coil; a piston in the form of a diaphragm which is displaceable under the action of the electrical coil against resilience of the diaphragm, which resilience then returns the diaphragm to an undisplaced condition; and
  a controller which controls the operation of the fuel injector;
  wherein:
  in each of at least a majority of engine cycles the fuel injector is operated on a plurality of occasions by the controller;
  in response to an increasing engine speed and/or load the controller increases in amount the fuel delivered per engine cycle by increasing in number the occasions the fuel injector is operated per engine cycle;
  in response to a decreasing engine speed and/or load the controller reduces in amount the fuel delivered per engine cycle by reducing in number the occasions the fuel injector is operated per engine cycle;
  displacement of the piston in a first direction draws fuel into the pumping chamber and displacement of the piston in the opposite direction expels fluid from the pumping chamber;
  return of the piston under action of the resilience thereof occasions a voltage in the coil;
  the controller uses the voltage occasioned by the piston motion under action of the resilience thereof to determine an indication of an amount of fuel vapour present in the pumping chamber; and
  the controller adjusts operation of the injector in dependence on the indicated amount of fuel vapour, the controller increasing in number the occasions the fuel injector is operated per engine cycle in response to an indication of an increased fuel vapour amount.

In a third aspect the present invention provides a fuel injection method for delivery of fuel for combustion in a combustion chamber of an internal combustion engine, the method comprising:

for a selected number of fuel delivery cycles in each engine operating cycle sequentially drawing into and then dispensing from a pumping chamber fuel for delivery to the combustion chamber;

drawing fuel into and dispensing fuel from the pumping chamber by displacement of a sprung piston;

displacing the sprung piston by applying an electromagnetic force to displace the piston against a spring then returning the piston by using the spring force;

using the return of the piston under the spring force to generate an electrical signal;

using the generated electrical signal to determine an amount of fuel vapour in the pumping chamber; and adjusting the selected number of fuel delivery cycles per engine operating cycle having regard to the determined amount of fuel vapour.

A pulse count injector (PCI) fuel injection system such as is described in GB-A-2421543 does not use high pressure fuel supply lines. Fuel vapour will be present in the fuel chamber and the amount of fuel delivered in each operation of the injector will depend on the amount of vapour. The present invention enables measurement of the fuel vapour percentage and so allows adjustment of operation of the injector, i.e. the number of operations of the injector in an engine cycle can be increased to offset the presence of fuel vapour in each fuel charge delivered so that a correct quantity of fuel is delivered for the engine cycle.

The present invention provides in a fourth aspect a fluid testing apparatus for comprising:

a pumping chamber;

a fluid inlet via which the fluid is drawn into the pumping chamber;

a fluid outlet via which the fluid is expelled from the pumping chamber;

a first one-way valve allowing flow of fluid into the pumping chamber from the fluid inlet while preventing flow of fluid out of the pumping chamber back to the fluid inlet;

a second one-way valve allowing flow of fluid out of the pumping chamber to the fluid outlet while preventing flow of fluid back into the pumping chamber from the fluid outlet;

an electrical coil;

a piston which slides axially in a first direction along a bore in the housing under action of the electrical coil;

a biasing spring which acts on the piston to slide the piston axially along the bore in a second direction opposite to the first direction; and an electronic controller which controls operation of the apparatus; wherein:

motion of the piston in one direction draws fluid into the pumping chamber and motion of the piston in the opposite direction expels fluid from the pumping chamber; and motion of the piston under action of the spring occasions a voltage in the coil which is output by the testing apparatus as a measurement signal.

The present invention provides in a fifth aspect a fluid testing apparatus comprising:

a pumping chamber;

a fluid inlet via which the fluid is drawn into the pumping chamber;

a fluid outlet via which the fluid is expelled from the pumping chamber;

a first one-way valve allowing flow of fluid into the pumping chamber from the fluid inlet while preventing flow of fluid out of the pumping chamber back to the fluid inlet;

a second one-way valve allowing flow of fluid out of the pumping chamber to the fluid outlet while preventing flow of fluid back into the pumping chamber from the fluid outlet; an electrical coil;

a piston in the form of a diaphragm which is displaceable under action of the electrical coil against resilience of the diaphragm, which resilience then returns the diaphragm to an undisplaced condition; and an electronic controller which controls operation of the apparatus; wherein:

displacement of the piston in one direction draws fluid in the pumping chamber and displacement of the piston in the opposite direction expels fluid from the pumping chamber; and return of the piston by the resilience of the diaphragm occasions a voltage in the coil which is output by the term apparatus as a measurement signal.

The present invention provides in a sixth aspect a method of testing a fluid comprising:

drawing the fluid into a pumping chamber;

subsequently expelling the fluid from the pumping chamber;

drawing the fluid into the pumping chamber and expelling the fluid from the pumping chamber by displacement of a sprung piston;

displacing the piston by forcing the piston against the spring force and then using the spring force to return the piston; and using the displacement of the piston under the sprung force to generate an electrical signal which is output for use as a measurement signal.

Although the present invention is of particular use in a fuel injector as described herein, because it uses no extra hardware components, the invention could be applied elsewhere, drawing fluid from a supply line (e.g. in a manufacturing plant) and measuring the amount of fluid vapour present.

Preferred embodiments of the present invention will now be described with reference to the accompanying drawings, in which:

FIG. 4 shows at:

Figure 1:
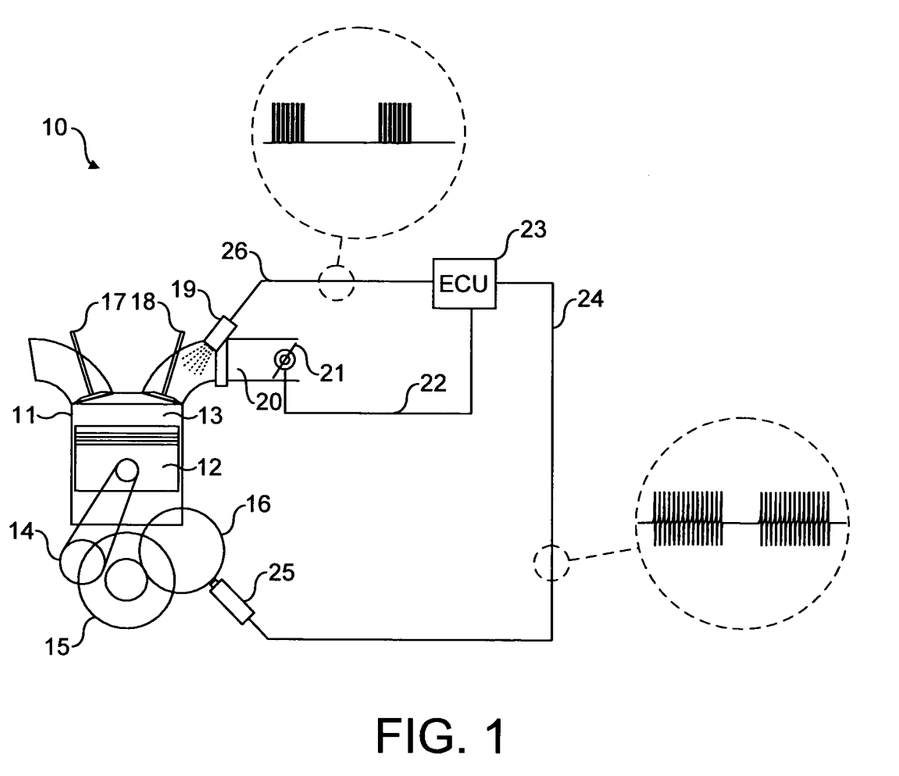
FIG. 1 is a schematic representation of an internal combustion engine with a fuel injection system which facilitates fuel vapour measurement according to the present invention.

Turning first to FIG. 1, there can be seen in the Figure an internal combustion engine 10 comprising a cylinder 11 in which reciprocates a piston 12 with the cylinder 11 and piston 12 defining between them a combustion chamber 13. The piston 12 is connected by a connecting rod 14 to a crankshaft 15, which in turn is connected to a cam shaft 16. A mechanism (not shown) such as a push-rod type mechanism, is used between the cam shaft 16 and two poppet valves 17 and 18 which are the exhaust and inlet valves of the engine. The cam shaft 16 will drive the inlet valve 18 and the exhaust valve 17 to open in timed relationship to the movement of the piston 12 in the cylinder 11 with return springs biassing the poppet valves 17 and 18 back into their valve seats. The engine 10 is a simple engine, a single cylinder engine of, for instance, a lawn mower or other garden equipment.

The engine 10 has a fuel injection system comprising a fuel injector 19 arranged to deliver fuel into an inlet passage 20 upstream of the inlet valve 18. A throttle valve 21 is placed in the inlet passage 20 to throttle the flow of charge air into the combustion chamber 13. A sensor is connected to throttle valve 21 and feeds back the signal via a line 22 to an electronic control unit 23, the signal indicating the rotational position of the throttle valve 21 and therefore engine load. The ECU 23 also receives a timing signal via a line 24, the timing signal being generated by a cam shaft sensor 25 (which could be replaced by a crankshaft sensor instead). Having regard to the timing signal produced by the sensor 25, the load signal produced by the sensor attached to throttle valve 21 and also having regard to a measurement of fuel vapour (described later), the ECU 23 generates a control signal which is relayed via line 26 to the injector 19 and controls operation of the injector 19.

Figure 2:
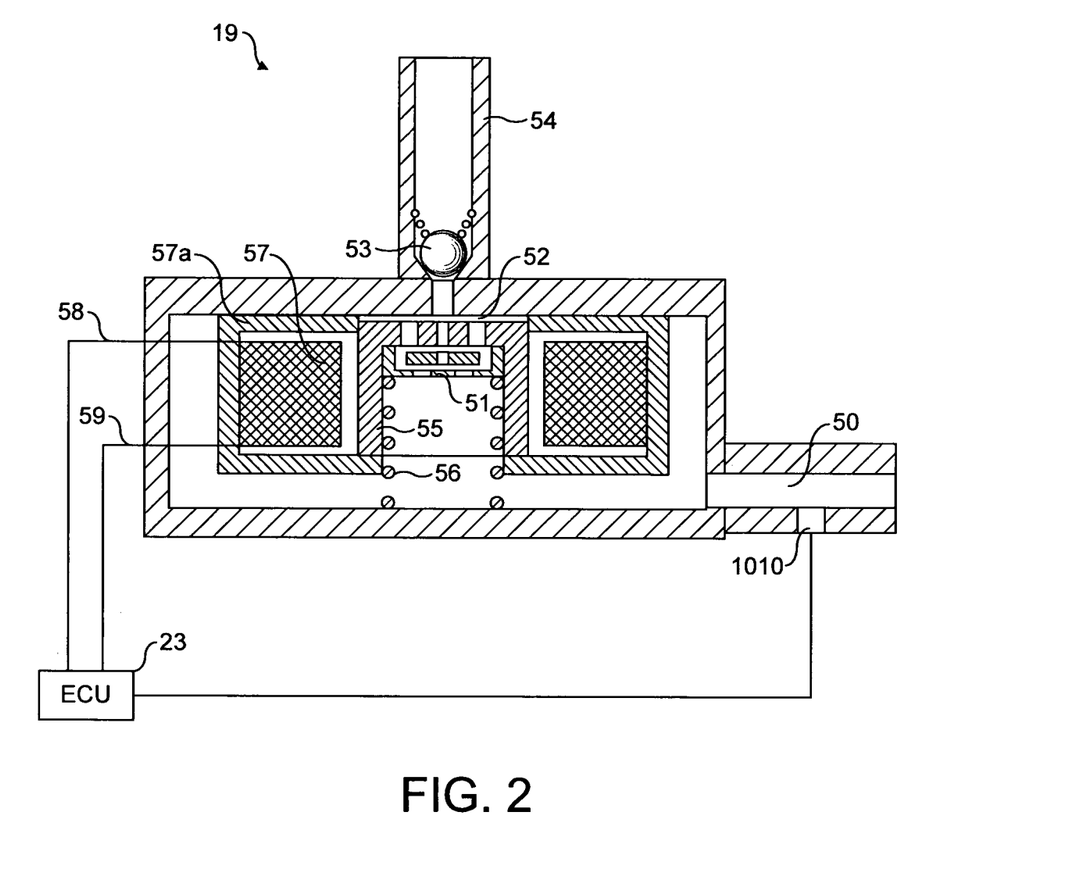
FIG. 2 is a schematic illustration of a first type of fuel injector used in the engine of FIG. 1.

A fuel injector suitable for the operation as the injector 19 of FIG. 1 is shown in FIG. 2. The injector operates as a pump to positively displace a volume of fuel therefrom, the volume swept by a piston 55 of the injector 19 remaining constant across each and every operation of the injector 19.

The injector 19 of FIG. 2 has a fuel inlet passage 50 which will be connected to a fuel tank (not shown) to receive fuel under a simple gravity feed arrangement (not shown). A one-way inlet valve 51 controls flow of fuel from the inlet passage 50 into a fuel pumping chamber 52 of the injector. A sprung-loaded one-way outlet valve 53 controls flow of fuel out of the fuel pumping chamber 52 to a fuel outlet pipe 54 through which the fuel can be delivered (directly or via a conduit to a remote spray nozzle) into the air intake passage 20.

The piston 55 is slidably located in an injector body. It is acted upon by a biasing spring 56 and is surrounded by a coil 57. The two ends of coil 57 are connected by the lines 58 and 59 (shown together as 26 in FIG. 1) to the ECU 23.

Starting from a condition in which the piston 55 is biased to its uppermost point by the biasing spring 56 (i.e. the point at which the fuel pumping chamber 52 has its smallest volume), energisation of the coil 57 then acts to pull the piston 55 into contact or near contact with a back-iron 57a which surrounds the coil 57 and concentrates the field generated by the coil 57. The piston 55 moves downwards against the force of the biasing spring 56 to increase in volume the fuel pumping chamber 52 and to draw fuel into the fuel chamber 52, the one-way valve 51 opening to allow the piston 55 to draw fuel into the fuel chamber 52 from the fuel inlet 50. As shown the one-way valve 51 comprises a plate located in a chamber in the piston 55 which is held against a lower surface of the piston chamber by fluid pressure as the piston 55 reduces the volume of fuel pumping chamber 22, thereby preventing flow out of the fuel pumping chamber 22. Other types of one-way inlet valves (e.g. spring-loaded) could be used.

Once the solenoid 57 is grounded, then the field generated by coil 57 will subside and the biasing spring 56 will force the piston 55 upwardly and away from the back-iron 57a. The upward motion of the piston 55 will cause the fuel chamber 52 to decrease in volume and this will have the effect of closing the one-way valve 51 and opening the one-way valve 53. The moving piston 55 expels fuel from the fuel inlet 50 to the fuel outlet 54 for delivery to a combustion chamber 13 of the engine.

The injector is constructed so that the piston 55 has a set distance of travel in each operation. The piston 55 moves between two end stops. Thus, in each and every operation of the injector, the piston 55 sweeps a set volume which is constant for each and every operation.

FIG. 2 shows also a temperature sensor 1010 (e.g. a thermocouple) which measures temperature of the fuel flowing through the fuel inlet 50 and provides a signal indicative of the measured temperature to the ECU 23. An alternative would be to measure the exterior surface temperature of the fuel inlet 50 rather than measure the temperature of the fuel directly.

Figure 3:
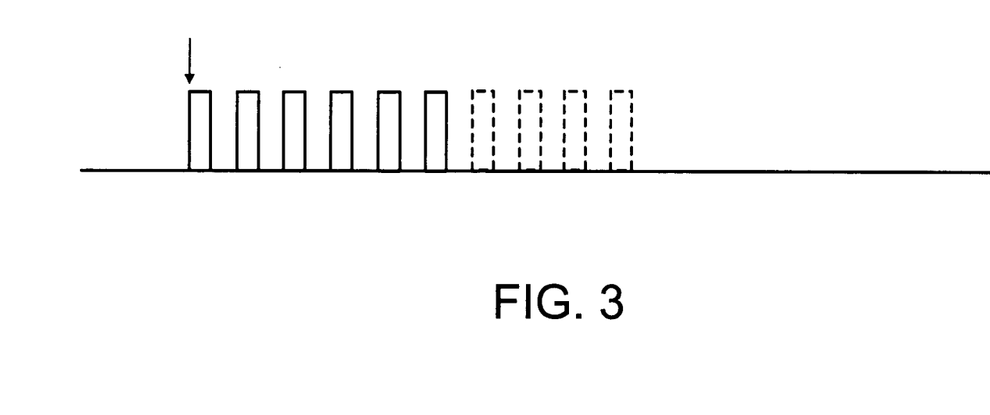
FIG. 3 shows the control signal used by the present invention to activate the fuel injector of FIG. 2 in order to control the amount of fuel delivered into the combustion chamber of the FIG. 1 engine in each operating cycle of the engine.

FIG. 3 graphically illustrates the control signal generated by the ECU 23 to control the fuel injector 19 in the present invention. A form of control called pulse count injection is used. There can be seen in solid lines six different pulses. These are the pulses for a single cycle of engine operation, i.e. the delivery of charge fuel for a single combustion event in the combustion chamber 13. Each pulse represents one operation of the injector 19. The total amount of fuel delivered for combustion is controlled by controlling the number of operations of the injector for a particular engine operating cycle. In the case illustrated in solid lines, the injector 19 is operated six times to deliver a total quantity of fuel equal to six times to deliver this fuel into the air intake passage 20 for mixing with air to be delivered into the combustion chamber 13. The first operation of the injector 19 will take place whilst the inlet valve 18 is closed but it may be that the valve is open or has at least started to open by the time of the last operation of the injector 19.

In FIG. 3 the dotted line pulses show that a greater amount of fuel can be delivered in the operating cycle by operating the injector a greater number of times. FIG. 3 illustrates a total possible pulse count of 10 pulses.

Figure 4A:
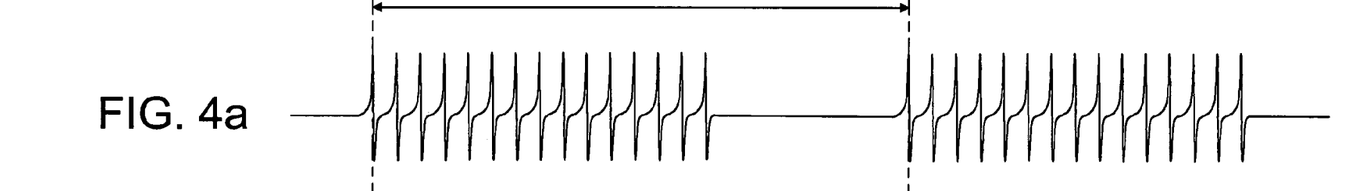
FIG. 4a a rotation signal taken from an engine cam shaft or crank shaft of the FIG. 1 engine, FIG. 4b a control signal generated for full load operation of the FIG. 1 engine, FIG. 4c a control signal generated for part load operation of the FIG. 1 engine, FIG. 4d a control signal generated for engine idling of the FIG. 1 engine, FIG. 4e a control signal generated during starting of the FIG. 1 engine.

More detail is given in FIGS. 4a to 4e. FIG. 4a shows the cam shaft or crank shaft signal received on line 24 by the ECU 23. The pulses illustrated in the signal give an indication of the rotational position of the crank shaft or cam shaft. In FIGS. 4b to 4e it is seen that the ECU 23 times its own pulses in the control signal it generates to be synchronised with the pulses in the timing signal shown in FIG. 4a. In fact, it is the pulses in the timing signal of FIG. 4a which trigger the ECU 23 to generate its own control pulses, as shown in FIGS. 4b to 4e.

Figure 4B:
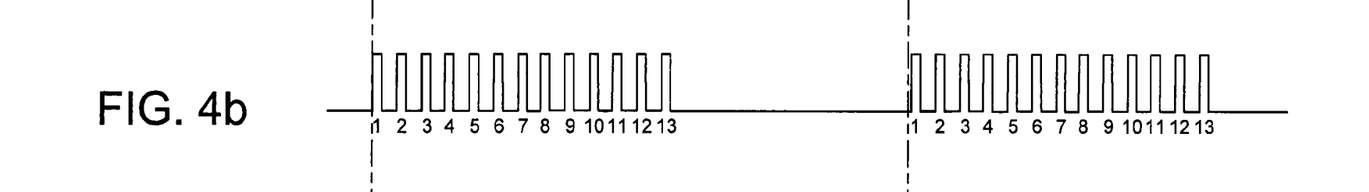

FIG. 4b shows full load operation. Therefore, in each engine cycle (an engine cycle takes place between the chain dot lines in the Figure) the ECU generates a control signal shown at FIG. 4b which comprises thirteen pulses which operate the injector 19 thirteen times.

Figure 4C:
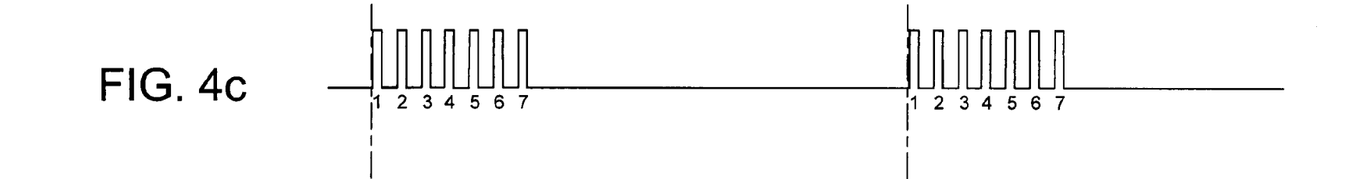

FIG. 4c shows the control signal generated in each engine cycle for part load operation. In this case, the control signal in each cycle comprises seven pulses which operate the injector 19 seven times in each engine cycle. Thus, the amount of fuel delivered in each engine cycle is 7/13 of the fuel that is delivered in full load operation.

Figure 4D:
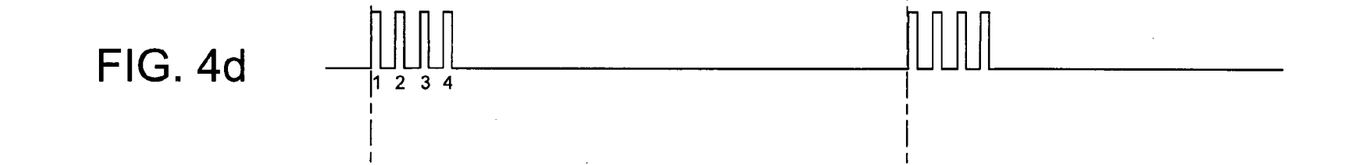

FIG. 4d shows the control signal generated by the ECU through idle operation, i.e the time when the least amount of fuel is delivered in each engine cycle. FIG. 4d shows that the injector 19 is operated only 4 times in each engine cycle.

Figure 4E:
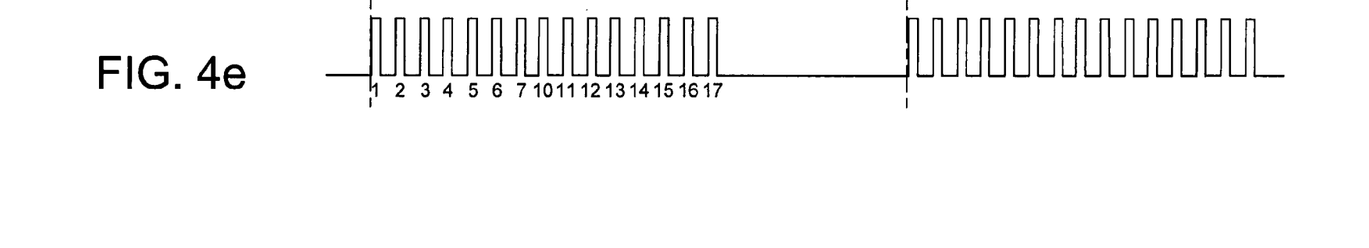

Finally, FIG. 4e shows an exceptional condition of engine starting in which an over rich mixture of fuel and air is delivered into the combustion chamber 13 to enable starting of the engine. Seventeen pulse counts are shown for each engine cycle and this means that the injector 19 is operated seventeen times through each engine cycle at the time of starting the engine.

It will be appreciated that the engine described above removes the need for a separate fuel pump, and a pressure regulator and dramatically simplifies the function of the ECU. The fuel injection system comprises a simple control system that counts the desired number of pulses into the engine for its correct operation. Whilst this does not give the degree of control possible with the prior art system (i.e. the total volume of fuel delivered cannot be varied continuously within a range, but only by fixed intervals or fixed amounts) this will be sufficient for a simple engine such as is used in a lawnmower. Putting it another way, the control possible with pulse count injection gives a coarser control of the amount of fuel delivered to the engine, but this will be sufficient for the simple engines involved.

As described above, the fuel delivered from the injector can be passed to a simple plain orifice or nozzle (see FIG. 2) or can be passed through an atomising device such as a pressure spray nozzle (not shown) or an electrostatic charging unit. The injector (or pulsing unit) can be close-coupled to the atomising unit or located elsewhere on the engine some distance away (i.e. the FIG. 2 embodiment could have a fuel outlet that leads to a dispensing nozzle some distance away from the injectors shown).

The volume of fuel delivered by the fuel injector will be to some degree dependent on engine size and the range of engine operating conditions. Typically, an injector will deliver between 0.05 mm$^3$ and 0.1 mm$^3$ per pulse. Typically the total volume delivered in each engine cycle will be between 0.1 and 0.5 mm$^3$ If this is the case then the number of pulses required for correct engine operation will vary from five to ten pulses per engine cycle for engine idling and twenty to fifty pulses per cycle for a full load operation.

As the injector controls the quantity of fuel supplied itself, there is no need for a controlled fuel supply pressure and this means that fuel may be fed directly to the injector via a gravity feed system with no problem being caused by varying pressure due to the different head of fuel as the fuel level falls. Alternatively, a simple low pressure fuel pump could be used, as often used with carburettors. The only requirement is that sufficient fuel is delivered to the injector so that it can recharge itself for the next pulse.

Gasoline fuel is prone to vaporisation at the working temperatures of an internal combustion engine. The degree of vaporisation can vary significantly with the time of year and in hot summer operating conditions, vaporisation of fuel can be very significant. Also different fuel formulations used e.g. for winter and summer can affect fuel vaporisation. Furthermore, it is the case that when the fuel tank is initially recharged, there is a greater degree of vaporisation than when fuel has been sitting in a tank for a period of time. This is because the "lighter" elements of the fuel vaporise first and a fresh tank of fuel will have a greater proportion of lighter elements than an older tank of fuel.

The amount of fuel delivered to the engine by each operation of the fuel injector can be significantly affected by vaporisation, particularly in hot summer working conditions. This is because as the fresh fuel charge is drawn into the fuel chamber 52, vapour can be drawn in and/or vaporisation can take place. Therefore, when the piston 55 is against its lowermost end stop and the fuel chamber 52 has its greatest volume then a significant part of the volume of the fuel chamber 52 can comprise fuel vapour rather than fuel in liquid form. This reduces the actual volume of fuel delivered by the injector in each operation of the injector.

The applicant has devised a way of measuring the proportion of the volume of the fuel chamber 52 which is occupied by vapour rather than fuel in liquid form. This method of measurement can be implemented in the fuel injector of FIG. 2 without a need for any extra components of hardware.

As mentioned above, the coil 57 is energised in order to draw the piston 55 into abutment (or at least close proximity) with the back-iron 57a. Then the coil 57 is de-energised to allow the spring 56 to move the piston 55 to expel fuel from the chamber 52. The movement of the piston 55 under the action of the spring 56 induces a voltage in the coil 57, this voltage commonly being referred to as a "back EMF". The applicant has realised that this induced voltage is a measure of movement of the piston 55. The maximum piston speed will be faster when there is a greater percentage of vapour in the mixture of fuel vapour and liquid fuel drawn into the chamber. This is reflected in the back EMF signal.

Figure 7A:
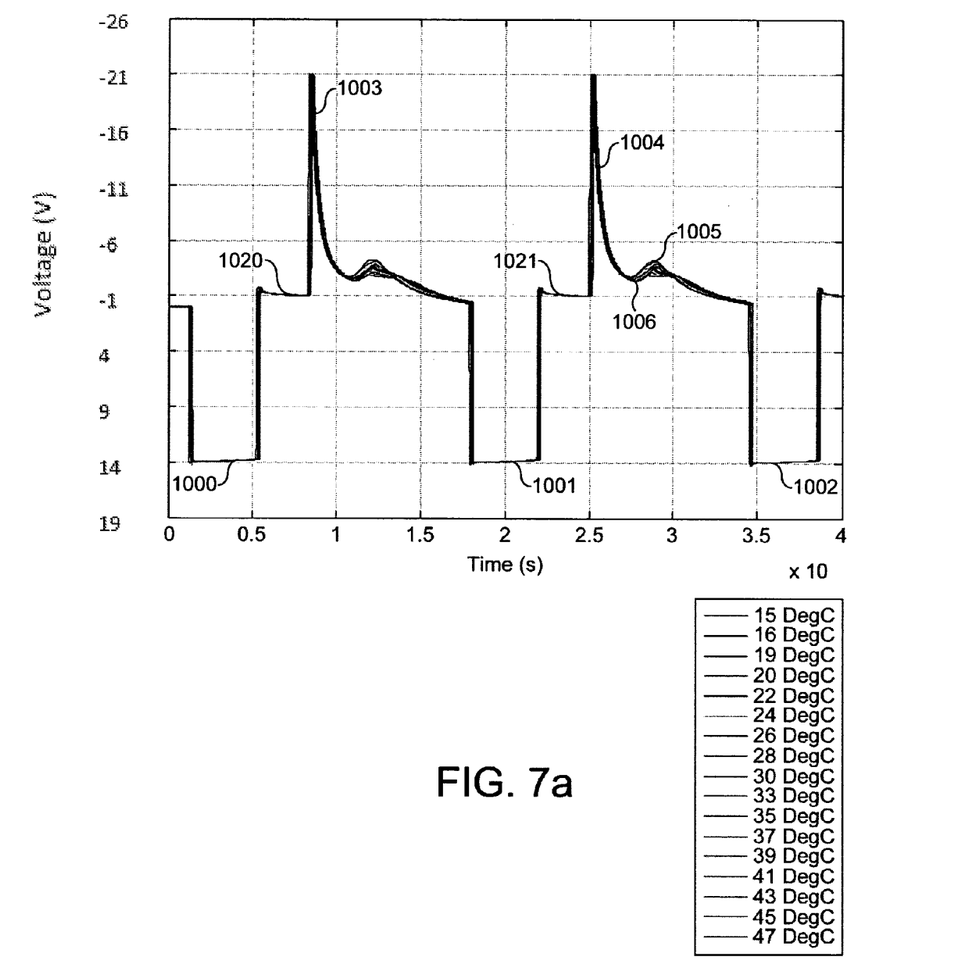
FIGS. 7a and 7b are graphical representations of back EMF signals occasioned in the coil of the apparatus of FIG. 2 or FIG. 6 by motion of the piston of the apparatus under the action of the spring of the apparatus.
Figure 7B:
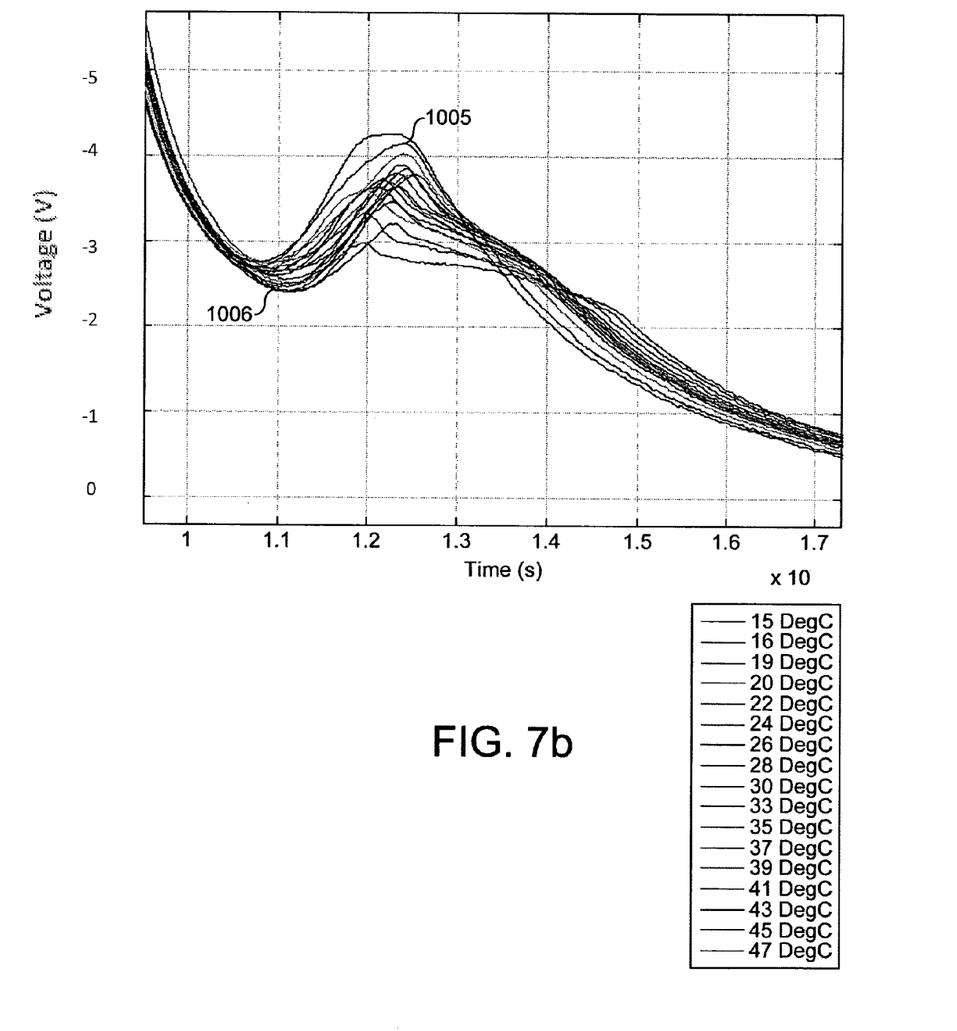

FIGS. 7a and 7b graphically illustrate the back EMF signal. FIG. 7a shows at 1000, 1001 and 1002 the square wave external voltage pulses applied by the controller to the coil to move the piston. At 1003 and 1004 there can be seen the spikes caused when the coil 57 is grounded, in order to release the piston 55. Following these spikes the signals are related to the back EMF generated by the piston moving under influence of the spring, particularly the points 1005 and 1006 of FIG. 7a. Initially the piston will move quickly while there is vapour in the fuel chamber and then when none is left the piston speed will slow dramatically as the piston starts to expel liquid fuel from the fuel chamber. The curves shown are for different percentage volumes of vapour in the fuel chamber. This is more clearly illustrated in FIG. 7b where a detail of the FIG. 7a signals is shown enlarged. The greater the percentage of the total chamber volume occupied by vapour then the greater the voltage peak 1005. The controller in a first method operates by sensing the point 1006 where the voltage increases after a period of sharp decrease and uses this as a reset signal after which the controller then stores the maximum voltage until it is next reset. The maximum voltage will always be the voltage at the point 1005. The value of the maximum voltage will give an indication of the percentage of the volume of the fuel chamber occupied by fuel vapour prior to the piston beginning its upward stroke to expel fuel. This can be done every pulse, or it may be done periodically, e.g. once in every 100 pulses.

Alternatively, the back EMF signal can integrated with respect to piston position with the result then being used by the electronic controller. This can be done every pulse, or it may be done periodically, e.g. once in every 100 pulses.

By using the back EMF signal to indicate a percentage of vapour in the chamber 52, the controller 23 can adjust operation to compensate for the presence of fuel vapour in the chamber. The presence of fuel vapour will mean that a smaller amount of fuel is injected in each operation of the injector and the controller will therefore increase the number of operations of the injector per engine cycle to compensate for this. Typically, the controller will include a look-up table against which the sensed back EMF signals will be compared and which will give then an indication of the percentage of fuel vapour in the fuel chamber 52. The controller will then adjust its operation accordingly.

The controller will deliver a different number of pulses in the control signal depending upon the load required by the engine as measured by the sensor 21 and also depending upon the percentage of fuel vapour detected in the fuel chamber as indicated by the back EMF signal. A simple electronic control circuit can be constructed from just a few IC chips which compare the signals from the throttle position sensor 21 and the back EMF signal with look-up tables to give the required number of pulse counts for the throttle position and for the percentage of fuel vapour. The electronic control unit then generates pulses triggered by the timing signal on line 24 and counts the number of pulses until the correct number of pulses is reached for an engine cycle. The pulse injector is then switched off until the next engine cycle.

If a fuel chamber is found to be, say 20% full of fuel vapour, then the number of pulses would typically be increased by 20% to compensate.

The controller can be operated to use "freewheeling" to keep the piston 55 in place after an electromagnetic force applied by the coil 57 has been initially used to displace it. Using "freewheeling", once a voltage has been applied by a pulse signal and the piston 55 has moved to its position in abutment with or adjacent to the coil 57, then the piston is held in place by connecting (by way of an electronic switch) together the two ends of coil to allow the current to flow freely. This free-flowing current will decay, but exists for long enough to hold the piston 55 in position whilst removing the need for the continuous application of an external voltage to the coil 57. When it is desired that the piston 55 should be released to be returned under the action of the spring 56 then the coil 57 is grounded and the back EMF voltage generation then follows. "Freewheeling" is shown at 1020 and 1021 in FIG. 7*a*, followed by the spikes 1003 and 1004 when the coil is grounded.

The issue of fuel vaporisation is at its worst when an engine is started after it has been running for a while and is hot. This is exacerbated if the hot engine has run out of fuel and cold fuel is used to fill the tank. The light elements in this fuel will boil away immediately and there will be a lot of vapour.

The back EMF measurement technique described above can be used to identify the percentage of fuel vapour in the fuel chamber and the operation of the injector is modified by the controller by adding pulses. An alternative way of proceeding is to vary the frequency of operation for such hot start conditions. By lowering the frequency of operation the fuel chamber will be given more time to fill up. Since the engine operates only slowly on start up the injector has time to operate more slowly. The lower frequency operation can be achieved without a significant increase in the electrical power used by the control system. The "freewheeling" mentioned above can be allowed to continue for longer for each pulse. The frequency of operation would be increased gradually as the light ends of the fuel burns off in the fuel stabiliser. This will not take long.

It is possible that both the number of pulses and also the frequency of operation could be jointly and simultaneously varied in order to compensate for fuel vapour.

In FIG. 2 there can also be seen the temperature sensor 1010 which senses the temperature of the fuel drawn into the fuel chamber 52. By measuring temperature and also measuring the vapour percentage, the electronic control unit 23 can determine the type of fuel used and can then modify operation of the injector accordingly. This is important since ethanol blends of fuel are becoming more prevalent. Ethanol is less dense in calorific value than gasoline and hence the injector operation needs to be adapted.

The present invention enables a single simple injector to cope with different fuels with different vapour pressures and also with varying temperatures (there will be increased vapour production with increased temperature).

Figure 5:
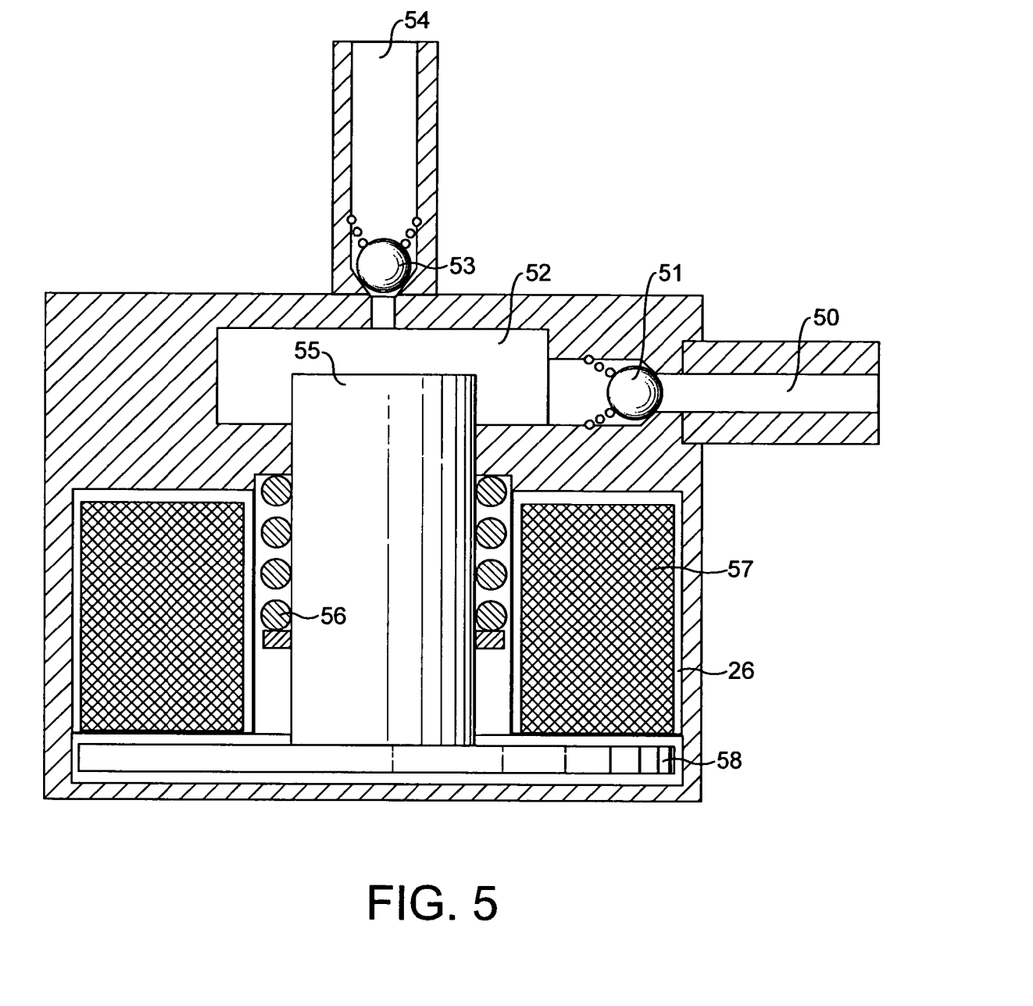
FIG. 5 is a schematic illustration of a second type of fuel injector used in the engine of FIG. 1.

FIG. 5 shows a different type of injector for use in the FIG. 1 fuel injection system. In this modification the functions of the coil and spring are reversed. The coil 26 is energised to expel fuel from the fuel chamber 52 and the biasing spring 56 is used to draw fuel into the chamber 52. When the chamber 52 contains fuel vapour then the speed of movement of the piston 55 under the action of the spring 56 will be related to vapour pressure of the fuel and the back EMF will in turn vary with changes in the piston speed and so will give an indication of fuel vapour pressure.

Figure 6:
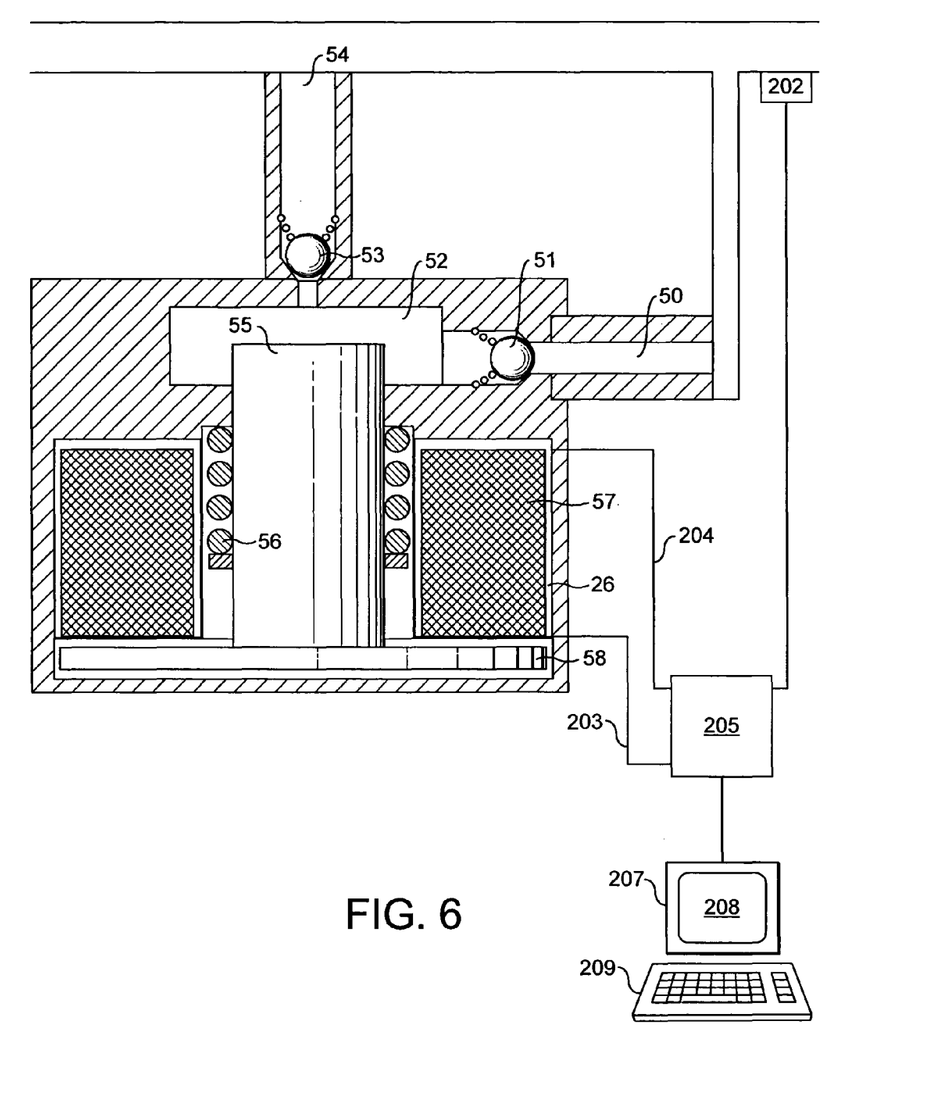
FIG. 6 shows a fluid pipeline having connected thereto a fluid testing apparatus according to the present invention.

In an extension of the present invention, the apparatus of FIG. 5 (or FIG. 2) can be used not as a fuel injector, but simply as testing apparatus for testing fluid, e.g. fluid in a fluid pipeline. This possibility is illustrated in FIG. 6 where a fluid pipeline 300 is shown. The inlet 50 of the unit 201 (which is identical to the unit shown in FIG. 5) is connected to the pipeline 300 to draw fluid from the pipeline 300. This fluid is then ejected from the chamber 52 by operation of the piston 55. In the manner described above, the back EMF generated in coil 57 by motion of the piston 55 under influence of the spring 56 is relayed via wires 203 and 204 to an electronic unit 205. Unit 205 will also control the application of voltage to the coil 57 to cause movement of the piston 55. The electronic unit 205 furthermore receives a temperature signal from a temperature sensor 202 arranged to sense the temperature of the fluid in the pipe 300. The electronic unit 300 uses the back EMF and the temperature signal to determine, from a pre-programmed mapping table stored in memory, the vapour pressure of the fluid in the pipeline 300 and also to determine what type of fluid is in the pipeline 300. This information is sent by a line 206 to an operator interface 207 which would typically comprise a screen 208 to display the measured information and a keyboard 209 to control operation of a measurement device. The apparatus can also be used to give an estimation of a percentage of vapour in a fluid pipeline, e.g. by using the FIG. 2 apparatus to draw fluid from the pipeline into the pumping chamber and then using the "back EMF" signal to indicate the amount of vapour in the pumping chamber. This amount will be related to the vapour pressure of the fluid and pre-programmed mapping tables can be used to determine this.

The present invention provides a very simple straightforward apparatus for determining the vapour pressure of and/or vapour content of a fluid flowing in the pipeline and also gives the potential of determining what fluid is flowing in a pipeline.

In the engine described above, only a single injector has been used for each working cylinder of the engine. However, the applicant envisages that each working cylinder could be provided with a plurality of injectors. This could have two advantages. First, in order to deliver a given amount of fuel in each engine cycle the number of operations of each individual injector would be decreased and this could have practical benefits since each injector would not need to operate at such a fast speed in use. Secondly, if the injectors for a particular working cylinder were constructed so that they delivered a differing amount of fuel to each other, then the engine management system could control the operation of both in a way that would give a "finer" control of the amount of fuel delivered in each working cycle. For instance, if an engine is provided with a single injector which injects 0.1 mm3 per pulse, then the total fuel injected per engine cycle will have to be a multiple of 0.1 mm3, i.e. 0.1 mm3, 0.2 mm3, 0.3 mm3 up to 0.5 mm3. However, if an engine is provided with two injectors, one which injects a pulse of 0.1 mm³ and the other which injects a pulse of 0.05 mm³ then the engine will be able to deliver in each engine cycle a total amount of fuel which could be 0.05 mm³, 0.1 mm³, 0.15 mm³, 0.2 mm³ etc. This is achieved with a smaller number of injector operations than would be necessary if the working cylinder had only an injector capable of a pulse of 0.05 mm³.

Two injectors could also be used to deliver two different fluids, e.g., in a two-stroke engine one could deliver gasoline fuel at the other two-stroke lubrication oil. The two fluids could also be two different types of fuel, e.g., gasoline and a bio-fuel such as ethanol. The same injector (e.g., as illustrated in FIG. 2 or FIG. 5) could be used for each fuel, with the difference in vapour pressure between the two fluids accommodated by the invention.

Figure 8:
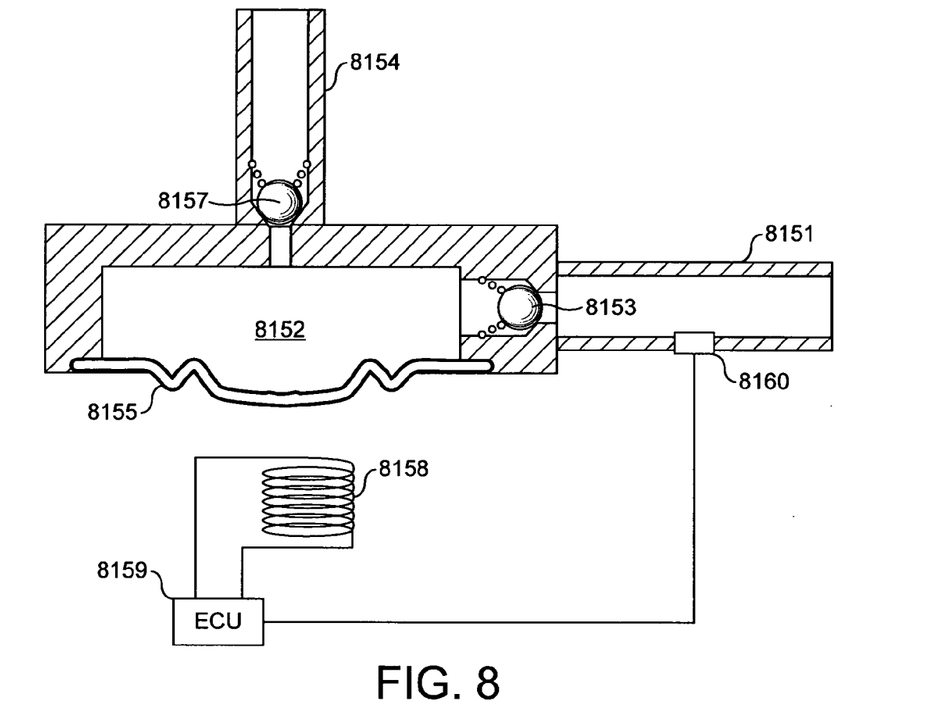
FIG. 8 is a schematic illustration of a third type of fuel injector used in the engine of FIG. 1.
Figure 9:
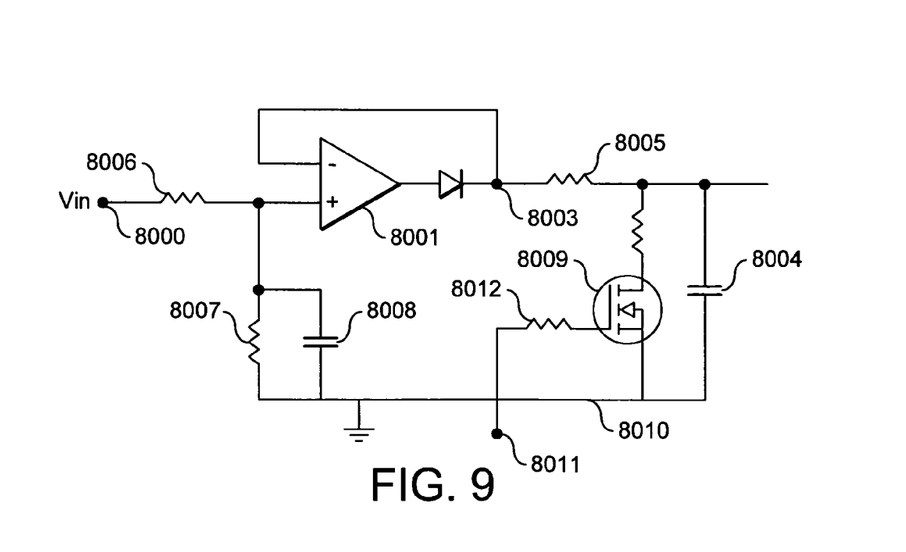
FIG. 9 is a diagram of a circuit used to capture a voltage taken from the coils of FIGS. 2, 5 and 6.

Whilst in FIGS. 2 and 5 above the arrangement shown comprises a piston 55 which slides axially in a bore defined in the injector, the invention could be implemented as shown in FIG. 8 with a piston formed by a resilient diaphragm 8155 which is displaced by an electrical coil 8157 (to either draw fuel/fluid into or expel fuel/fluid from a pumping chamber 8152) and then the inherent resilience of the diaphragm would be used to return the diaphragm to its pre-displaced condition. This will avoid the need for a spring as an additional element. Also shown in the FIG. 8 are a fuel inlet 8151, a fuel outlet 8154, a one-way inlet valve 8153, a one-way outlet valve 8157, an electrical coil 8158, an electronic controller 8159 and a temperature sensor 8160, all of which have the same functions as those disclosed in earlier Figures.

FIG. 8 is a circuit diagram of a peak voltage hold circuit which can be used to capture the maximum voltage of the voltage peak 1005 described previously with reference to FIG. 7b.

At 8000 a Vin signal is supplied which will be the voltage across the coil in the injector, the voltage illustrated in FIGS. 7a and 7b. This voltage is used as the input to an operation amplifier 8001. The operational amplifier 8001 is used in a voltage follower configuration. A diode 8002 is used for the output of the operation amplifier 8001 and the feedback of the operational amplifier 8001 is taken from the back of the diode 8002. Thus, the output voltage at node 8003 follows only the positive voltage error. The peak voltage is held on a capacitor 8004 connected between the operational amplifier and an earth rail 8010, with a shunt resistor 8005 used to limit current.

The voltage input to the operational amplifier 8001 is restricted in amplitude and filtered by use of resistors 8006 and 8007 and capacitor 8008, which are connected between the voltage type input 800 and earth rail 8010.

A field effect transistor 8009 is used to re-set the maximum voltage stored on the capacitor 8004. A control signal supplied at 8011 via a resistor 8012 to the transistor 8009 is controlled by a microprocessor (not shown) and re-sets to approximately zero the voltage stored on the capacitor 8004, by connecting the node 8003 with the earth rail 8010. The microprocessor will send the control signal periodically, e.g. when each pulse is sent to the coil of the injector to move the piston 55.

By storing the maximum voltage on the capacitor 8004, the need for processing power is reduced. Rather than needing a processor operating at very high frequency to track the voltage on the coil, the peak hold circuit of FIG. 8 serves to capture the relevant maximum voltage and then hold the voltage for a time in which it can be sampled by the processor, which can hence operate at a significantly lower frequency. Typically, the processor will have 0.5 milliseconds to sample the stored maximum voltage.

The invention claimed is

1. An internal combustion engine comprising:
a variable volume combustion chamber;
an air intake system for delivering charge air to the combustion chamber;
an exhaust system for relaying combusted gas from the combustion chamber to atmosphere; and
a fuel injection system for delivering fuel into the charge air for combustion therewith in the combustion chamber; wherein the fuel injection system comprises:
a fuel injector which functions as a positive displacement pump and which comprises: a housing in which a pumping chamber is formed; an electrical coil; a piston which slides axially in a bore in the housing under action of the electrical coil; and a biasing spring which acts on the piston; and
a controller which controls the operation of the fuel injector;
wherein:
in each of at least a majority of engine cycles the fuel injector is operated on a plurality of occasions by the controller;
in response to an increasing engine speed and/or load the controller increases in amount the fuel delivered per engine cycle by increasing in number the occasions the fuel injector is operated per engine cycle;
in response to a decreasing engine speed and/or load the controller reduces in amount the fuel delivered per engine cycle by reducing in number the occasions the fuel injector is operated per engine cycle;
motion of the piston in a first direction draws fuel into the pumping chamber and motion of the piston in the opposite direction expels fluid from the pumping chamber;
motion of the piston under action of the spring occasions a voltage in the coil;
the controller uses the voltage occasioned by the piston motion under action of the spring to determine an indication of an amount of fuel vapour present in the pumping chamber; and
the controller adjusts operation of the injector in dependence on the indicated amount of fuel vapour, the controller increasing in number the occasions the fuel injector is operated per engine cycle in response to an indication of an increased fuel vapour amount.

2. An internal combustion engine comprising:
a variable volume combustion chamber;
an air intake system for delivering charge air to the combustion chamber;
an exhaust system for relaying combusted gas from the combustion chamber to atmosphere; and
a fuel injection system for delivering fuel into the charge air for combustion therewith in the combustion chamber; wherein the fuel injection system comprises:
a fuel injector which functions as a positive displacement pump and which comprises: a housing in which a pumping chamber is formed; an electrical coil; a piston in the form of a diaphragm which is displaceable under the action of the electrical coil against resilience of the diaphragm, which resilience then returns the diaphragm to an undisplaced condition; and
a controller which controls the operation of the fuel injector;

wherein:
in each of at least a majority of engine cycles the fuel injector is operated on a plurality of occasions by the controller;
in response to an increasing engine speed and/or load the controller increases in amount the fuel delivered per engine cycle by increasing in number the occasions the fuel injector is operated per engine cycle;
in response to a decreasing engine speed and/or load the controller reduces in amount the fuel delivered per engine cycle by reducing in number the occasions the fuel injector is operated per engine cycle;
displacement of the piston in a first direction draws fuel into the pumping chamber and displacement of the piston in the opposite direction expels fluid from the pumping chamber;
return of the piston under action of the resilience thereof occasions a voltage in the coil;
the controller uses the voltage occasioned by the piston motion under action of the resilience thereof to determine an indication of an amount of fuel vapour present in the pumping chamber; and
the controller adjusts operation of the injector in dependence on the indicated amount of filet vapour, the controller increasing in number the occasions the fuel injector is operated per engine cycle in response to an indication of an increased fuel vapour amount.

3. An internal combustion engine as claimed in claim 1 wherein the fuel injection system comprises additionally a temperature sensor for measuring fuel temperature and the controller uses the measured fuel temperature in combination with the indicated fuel vapour amount to determine what type of fuel in injected and adjusts operation of the fuel injector accordingly.

4. An internal combustion engine as claimed in claim 1 wherein the controller controls operation of the electrical coil by applying an external voltage to the coil sufficient to displace the piston to a desired end position and then connects both ends of the coil together to allow current flow through the coil whereby the piston is held on the desired end portion without application of external voltage and next the controller grounds the coil to allow the current to die away and thereby to release the piston for movement.

5. An internal combustion engine as claimed in claim 4 wherein the controller can vary' in duration the period in which both ends of the coil are connected in order to vary operating frequency of the injector.

6. An internal combustion engine as claimed in claim 5 wherein the controller receives a signal indicative of engine speed and when the controller determines that engine speed is low and that the amount of fuel vapour is high then the controller reduces the operating frequency of the fuel injector in comparison with the operating frequency used for average operating speeds and average fuel vapour amounts.

7. An internal combustion engine as claimed in claim 1 in which the piston reciprocates between two end stops which ensure that the piston has a set distance of travel in each operation.

8. An internal combustion engine as claimed in claim 1 wherein for during movement of the piston under action of the spring or under action of the resilience of the diaphragm the controller detects when the voltage occasioned by the piston motion starts to increase after a period of decreasing voltage and then records a maximum voltage which follows.

9. An internal combustion engine as claimed in claim 1 wherein the electrical coil surrounds the piston.

10. An internal combustion engine as claimed in claim 1 wherein a sensor is associated with a crankshaft or a camshaft of the engine and produces a timing signal related to rotation of the crankshaft or camshaft, which timing signal is used by the electronic controller to set timing of the operations of the injector in each engine cycle.

11. An internal combustion engine as claimed in claim 1 wherein the fuel injector has a fuel inlet for admitting fuel into the fuel chamber and a fuel outlet via which fuel is forced from the fuel injector, the fuel injector also having a first one-way valve which allows fuel to flow into the fuel chamber from the fuel inlet while preventing flow of fuel from the fuel chamber back to the fuel inlet and the fuel injector further having a second one-way valve which permits fuel to flow out of the fuel chamber to the fuel outlet, white preventing flow of fuel back into the fuel chamber from the fuel outlet.

12. An internal combustion engine as claimed in claim 1 in which the controller comprises a peak voltage hold circuit for holding the maximum voltage occasioned by the piston motion under action of the spring or the resilience of the diaphragm, the peak voltage hold circuit comprising an operational amplifier which receives a voltage signal from the coil, a diode connected to the output of the operational amplifier, with a feedback signal for the operational amplifier taken from the output of the diode, and a capacitor connected to the output of the operational amplifier which holds a maximum voltage sampled by a processor of the controller.

13. An internal combustion engine as claimed in claim 12, wherein the capacitor is connected between the output of the operational amplifier and earth in parallel with a transistor and the transistor is controlled by a/the processor of the controller to periodically connect the output of the diode to earth to thereby reduce the voltage stored by the capacitor.

14. An internal combustion engine as claimed in claim 12, wherein a filter is used to filter the voltage signal supplied by the coil and the operational amplifier receives the filtered voltage signal.

15. An internal combustion engine as claimed in claim 1, wherein: the fuel injector delivers fuel of a first type; a second injector is provided to deliver into the charge air either a fuel of a second type or a lubricant, the second injector functioning as a positive displacement pump and comprising: a housing in which a pumping chamber is formed; an electrical coil; a piston which slides axially in a bore in the housing under action of the electrical coil; and a biasing spring which acts on the piston; the controller controls operation of both fuel injectors; and the controller uses voltages occasioned by piston motion under spring action or resilience of the pistons of both injectors to determine indications of the amounts of vapour in the pumping chambers of both injectors, the controller adjusting operation of the injectors accordingly.

16. An internal combustion engine as claimed in claim 1, wherein: the fuel injector delivers fuel of a first type; a second injector is provided to deliver into the charge air either a fuel of a second type or a lubricant, the second injector functioning as a positive displacement pump and comprising: a housing in which a pumping chamber is formed; an electrical coil; a piston in the form of a diaphragm which is displaceable under the action of the electrical coil against resilience of the diaphragm, which resilience then returns the diaphragm to an undisplaced condition; the controller controls operation of both fuel injectors; and the controller uses voltages occasioned by piston motion under spring action and/or resilience of the pistons of both injectors to determine indications of the amounts of vapour in the pumping chambers of both injectors, the controller adjusting operation of the injectors accordingly.

17. A fuel injection method for delivery of fuel for combustion in a combustion chamber of an internal combustion engine, the method comprising:
for a selected number of fuel delivery cycles in each engine operating cycle sequentially drawing into and then dispensing from a pumping chamber fuel for delivery to the combustion chamber;
drawing fuel into and dispensing fuel from the pumping chamber by displacement of a sprung piston;
displacing the sprung piston by applying an electromagnetic force to displace the piston against a spring then returning the piston by using the spring force;
using the return of the piston under the spring force to generate an electrical signal;
using the generated electrical signal to determine an amount of fuel vapour in the pumping chamber; and
adjusting the selected number of fuel delivery cycles per engine operating cycle having regard to the determined amount of fuel vapour.

18. An internal combustion engine as claimed in claim 2 wherein the fuel injection system comprises additionally a temperature sensor for measuring fuel temperature and the controller uses the measured fuel temperature in combination with the indicated fuel vapour amount to determine what type of fuel in injected and adjusts operation of the fuel injector accordingly.

19. An internal combustion engine as claimed in claim 2 wherein the controller controls operation of the electrical coil by applying an external voltage to the coil sufficient to displace the piston to a desired end position and then connects both ends of the coil together to allow current flow through the coil whereby the piston is held on the desired end portion without application of external voltage and next the controller grounds the coil to allow the current to die away and thereby to release the piston for movement.

20. An internal combustion engine as claimed in claim 19 wherein the controller can vary in duration the period in which both ends of the coil are connected in order to vary operating frequency of the injector.

21. An internal combustion engine as claimed in claim 20 wherein the controller receives a signal indicative of engine speed and when the controller determines that engine speed is low and that the amount of fuel vapour is high then the controller reduces the operating frequency of the fuel injector in comparison with the operating frequency used for average operating speeds and average fuel vapour amounts.

22. An internal combustion engine as claimed in claim 2 in which the piston reciprocates between two end stops which ensure that the piston has a set distance of travel in each operation.

23. An internal combustion engine as claimed in claim 2 wherein for during movement of the piston under action of the spring or under action of the resilience of the diaphragm the controller detects when the voltage occasioned by the piston motion starts to increase after a period of decreasing voltage and then records a maximum voltage which follows.

24. An internal combustion engine as claimed in claim 2 wherein the electrical coil surrounds the piston.

25. An internal combustion engine as claimed in claim 2 wherein a sensor is associated with a crankshaft or a camshaft of the engine and produces a timing signal related to rotation of the crankshaft or camshaft, which timing signal is used by the electronic controller to set timing of the operations of the injector in each engine cycle.

26. An internal combustion engine as claimed in claim 2 wherein the fuel injector has a fuel inlet for admitting fuel into the fuel chamber and a fuel outlet via which fuel is forced from the fuel injector, the fuel injector also having a first one-way valve which allows fuel to flow into the fuel chamber from the fuel inlet while preventing flow of fuel from the fuel chamber back to the fuel inlet and the fuel injector further having a second one-way valve which permits fuel to flow out of the fuel chamber to the fuel outlet, white preventing flow of fuel back into the fuel chamber from the fuel outlet.

27. An internal combustion engine as claimed in claim 2 in which the controller comprises a peak voltage hold circuit for holding the maximum voltage occasioned by the piston motion under action of the spring or the resilience of the diaphragm, the peak voltage hold circuit comprising an operational amplifier which receives a voltage signal from the coil, a diode connected to the output of the operational amplifier, with a feedback signal for the operational amplifier taken from the output of the diode, and a capacitor connected to the output of the operational amplifier which holds a maximum voltage sampled by a processor of the controller.

28. An internal combustion engine as claimed in claim 27, wherein the capacitor is connected between the output of the operational amplifier and earth in parallel with a transistor and the transistor is controlled by a the processor of the controller to periodically connect the output of the diode to earth to thereby reduce the voltage stored by the capacitor.

29. An internal combustion engine as claimed in claim 27, wherein a filter is used to filter the voltage signal supplied by the coil and the operational amplifier receives the filtered voltage signal.

30. An internal combustion engine as claimed in claim 2, wherein: the fuel injector delivers fuel of a first type; a second injector is provided to deliver into the charge air either a fuel of a second type or a lubricant, the second injector functioning as a positive displacement pump and comprising: a housing in which a pumping chamber is formed; an electrical coil; a piston which slides axially in a bore in the housing under action of the electrical coil; and a biasing spring which acts on the piston; the controller controls operation of both fuel injectors; and the controller uses voltages occasioned by piston motion under spring action or resilience of the pistons of both injectors to determine indications the amounts of vapour in the pumping chambers of both injectors, the controller adjusting operation of the injectors accordingly.

31. An internal combustion engine as claimed in claim 2, wherein: the fuel injector delivers fuel of a first type; a second injector is provided to deliver into the charge air either a fuel of a second type or a lubricant, the second injector functioning as a positive displacement pump and comprising: a housing in which a pumping chamber is formed; an electrical coil; a piston in the form of a diaphragm which is displaceable under the action of the electrical coil against resilience of the diaphragm, which resilience then returns the diaphragm to an undisplaced condition; the controller controls operation of both fuel injectors; and the controller uses voltages occasioned by piston motion under spring action and/or resilience of the pistons of both injectors to determine indications of the amounts of vapour in the pumping chambers of both injectors, the controller adjusting operation of the injectors accordingly.

* * * * *